United States Patent [19]
Chang

[11] Patent Number: 4,824,278
[45] Date of Patent: Apr. 25, 1989

[54] POSITIONING JOINT FOR FOLDING LADDERS

[75] Inventor: Moon S. Chang, Seoul, Rep. of Korea

[73] Assignee: Woo Kyong Industrial Co., Ltd., Seoul, Rep. of Korea

[21] Appl. No.: 73,585

[22] Filed: Jul. 15, 1987

[30] Foreign Application Priority Data

Feb. 21, 1987 [KR] Rep. of Korea .................. 2003/87

[51] Int. Cl.$^4$ .................. F16C 11/00; E06C 7/50
[52] U.S. Cl. .................. 403/93; 403/96; 403/61; 182/163; 16/332
[58] Field of Search .................. 403/93, 96, 99, 95, 403/102, 328, 92, 98, 61; 182/163, 164; 16/332, 334, 349, 325, 324, 344

[56] References Cited

U.S. PATENT DOCUMENTS

| | | | |
|---|---|---|---|
| 2,502,641 | 4/1950 | Consor | 403/93 X |
| 3,955,240 | 5/1976 | Schuh et al. | 403/93 X |
| 4,474,264 | 10/1984 | Krause | 182/163 |
| 4,540,306 | 9/1985 | Wang | 403/93 |
| 4,543,006 | 9/1985 | Wang | 403/93 |
| 4,611,945 | 9/1986 | Diego | 403/61 |
| 4,645,371 | 2/1987 | Wang | 16/332 X |
| 4,770,559 | 9/1988 | Yoo | 182/163 X |

FOREIGN PATENT DOCUMENTS 949976 12/1960 United Kingdom .................. 403/93

Primary Examiner—Andrew V. Kundrat
Assistant Examiner—Peter M. Cuomo
Attorney, Agent, or Firm—Watson, Cole, Grindle & Watson

[57] ABSTRACT

A positioning joint for a folding ladder comprising a first joint member, a second joint member, an operating lever pivotably connected to the first joint member and U-shaped members acting as a control means. The U-shaped member has a sustaining portion and two bolt receiving portions each with a central bore which is embodied in the shape of an ellipse. The joint members, lever and U-shaped member are pivotally interconnected permitting engagement and disengagement of spring and pawl units with the U-shaped member for thereby locking and unlocking the joint.

2 Claims, 5 Drawing Sheets

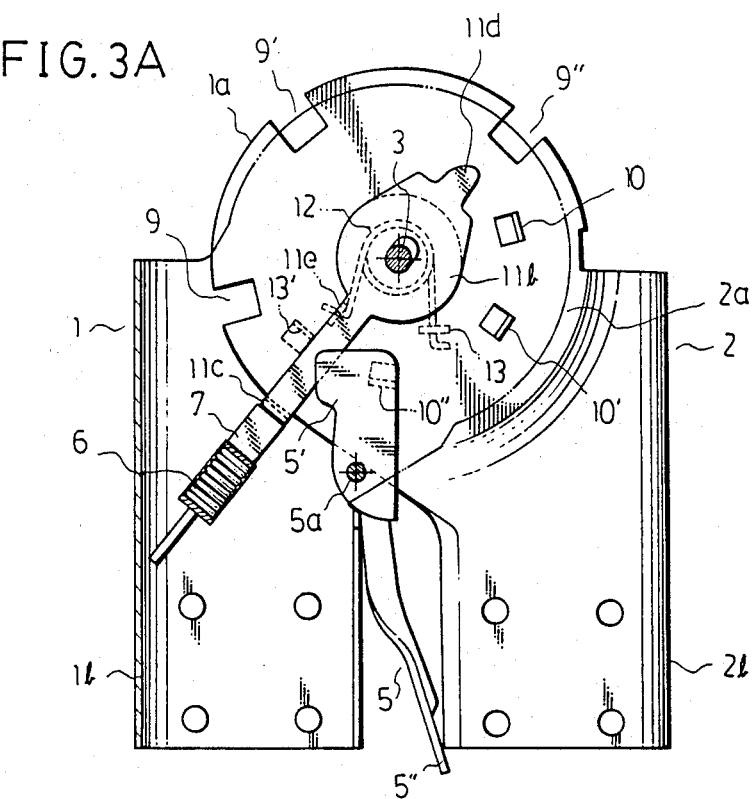
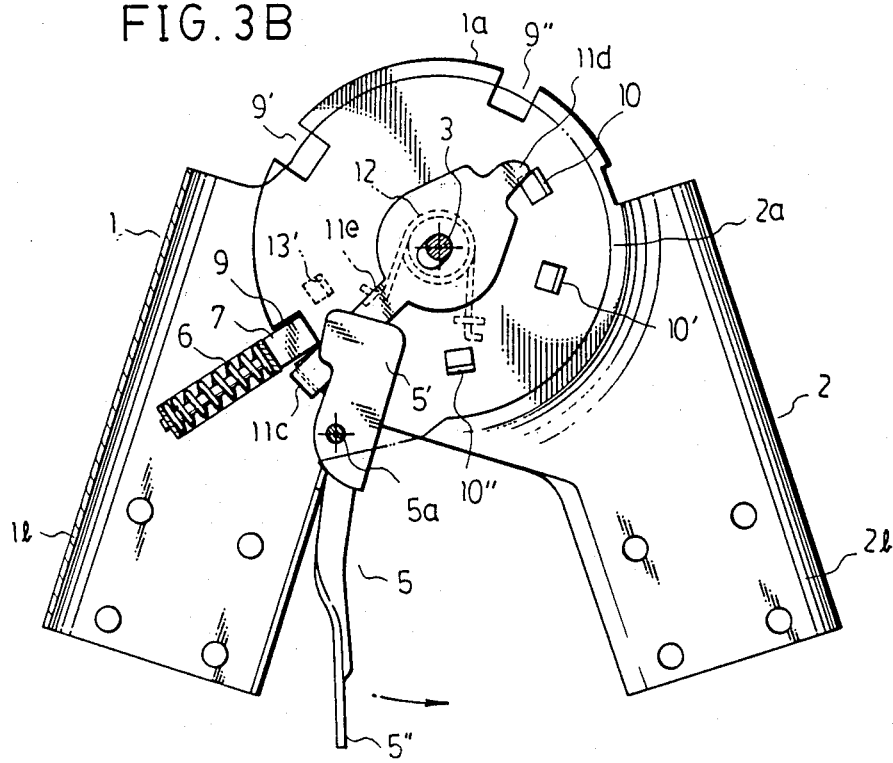

POSITIONING JOINT FOR FOLDING LADDERS

BACKGROUND OF THE INVENTION

This invention relates to a positioning joint for a folding ladder.

In a conventional positioning joint for a folding ladder, the folding or unfolding of the ladder to a desired angular position is performed by aligning holes in side discs and inserting a pin into the holes in the discs. A joint of this type has the disadvantage that it is difficult to quickly align the holes in both side discs simultaneously.

Another prior art joint for a folding ladder utilizes a ratchet which causes users to be concerned about the safety of such a joint because of potential malfunctions of the ratchet.

A further prior art position joint for a folding ladder utilizes a clawed control means, as set forth in U.S. Pat. No. 4,540,306, but which has a drawback in that it malfunctions easily unless the user exercises great care in operating the ladder to the desired angular position and a further disadvantage in that it is difficult to manufacture the joint because of the use of a tension spring.

SUMMARY OF THE INVENTION

Accordingly, a principal object of the present invention is to provide an improved positioning joint for a folding ladder which will reduce or eliminate the aforesaid defects, be more convenient for manufacturing, and insure safety in use while at the same time to be easy to operate.

According to the present invention, there is provided an improved positioning joint for a folding ladder in which two joint members which are pivotable with respect to each other about a common axis is lockable in a series of predetermined angular positions by engaging a spring-biased pawl provided within one member in notches formed at the peripheral edge of the other member, wherein a control means in cooperation with a manually operated lever controls the locking and unlocking of the joint.

The improvement includes a U-shaped member, acting as the control means for locking and unlocking the joint pivoted by an axial bolt and located between the inner side walls of the main-disc portion of the one joint member and the outer side walls of the sub-disc portion, of the other joint member, has a sustaining portion for engaging and disengaging the pawl, two bolt receiving portions each with a central elliptically shaped bore, a protrusion at the end of one of the bolt receiving portions and a hook-like projection formed between the other of the bolt receiving portions and the sustaining portion.

The main-disc portion has a limit stop and a hook-like projection extending toward the U-shaped member, and a spring loosely coiled about the bolt, the spring having ends respectively engaging the hook-like projections for biasing the U-shaped member against the limit stop.

The sub-disc portion has spaced projections extending toward the protrusion, one of the spaced projections engaging the protrusion for shifting the U-shaped member out of engagement with the stop when unfolding the joint to permit the pawl to engage in one of the notches, the spring shifting the U-shaped member away from the one projection during the unfolding of the joint.

The protrusion has a curved edge permitting the U-shaped member to by-pass the spaced projections without stopping when folding the joint.

Other features of the present invention will become more apparent from the following detailed description of the invention when taken in conjunction with the accompanying drawings.

BRIEF DESCRIPTION OF THE DRAWINGS

In the drawings,

FIGS. 3A to 3E are cross sectional views of the positioning joint for a folding ladder according to the present invention illustrating the increments by which the positioning joint is operated;

DETAILED DESCRIPTION OF THE INVENTION

Figure 1:
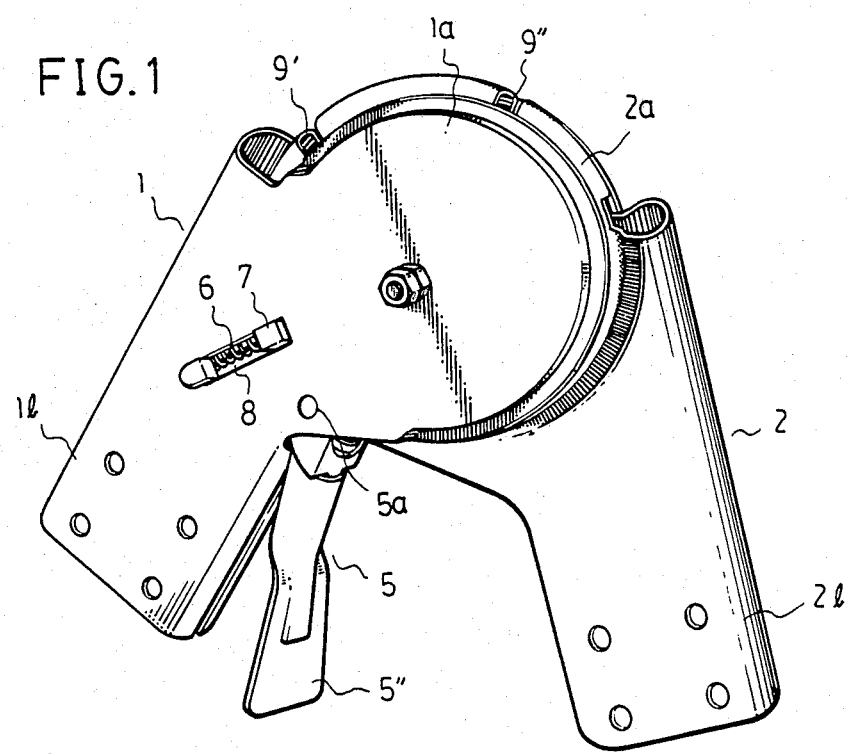
FIG. 1 is a perspective view of the positioning joint for a folding ladder according to the present invention.
Figure 2:
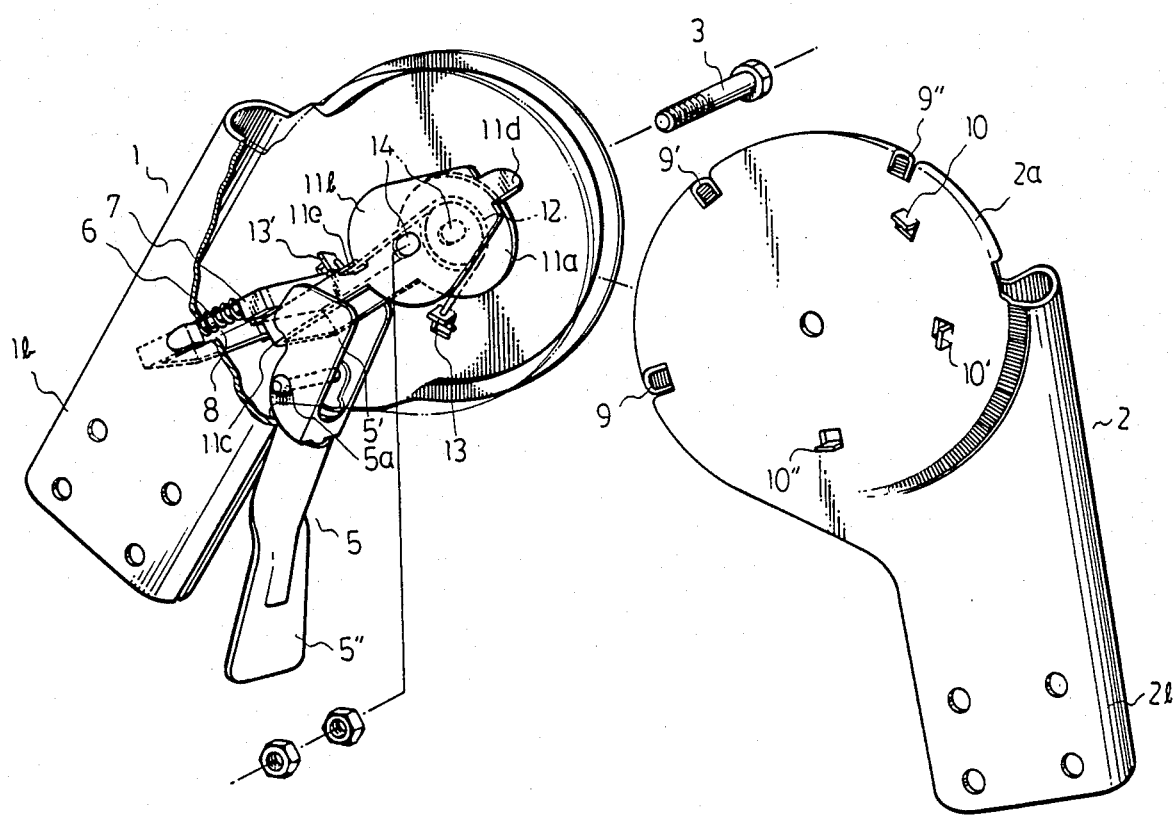
FIG. 2 is a partially cut away and exploded perspective view of the positioning joint for a folding ladder, shown in FIG. 1.

The positioning joint for a folding ladder according to the present invention comprises, as shown in FIGS. 1 and 2, a first joint member 1 and a second joint member 2.

The construction of the first joint member 1 is somewhat similar to a conventional joint member, i.e., it may be formed, for example, of sheet metal pressed into the shape of a main disc portion 1a having two spaced-apart, symmetrically disposed circular plates and a tubular portion 1b. The tubular portion 1b is provided with two rectangular slots 8, one on each side thereof, and a pawl 7 slidably engaged at both ends in the slots 8 and spring-biased by a spring 6. The manually operated lever 5 is pivotably connected to a border of the main-disc portion 1a and the tubular portion 1b by a pivot pin 5a. The operating lever comprises a forked release element 5' and a handle 5". The spacing between the open ends of the forked release element 5' is sufficiently wide to enable a U-shaped member 11, as shown in FIG. 4, to be inserted and operated therebetween.

Figure 4:
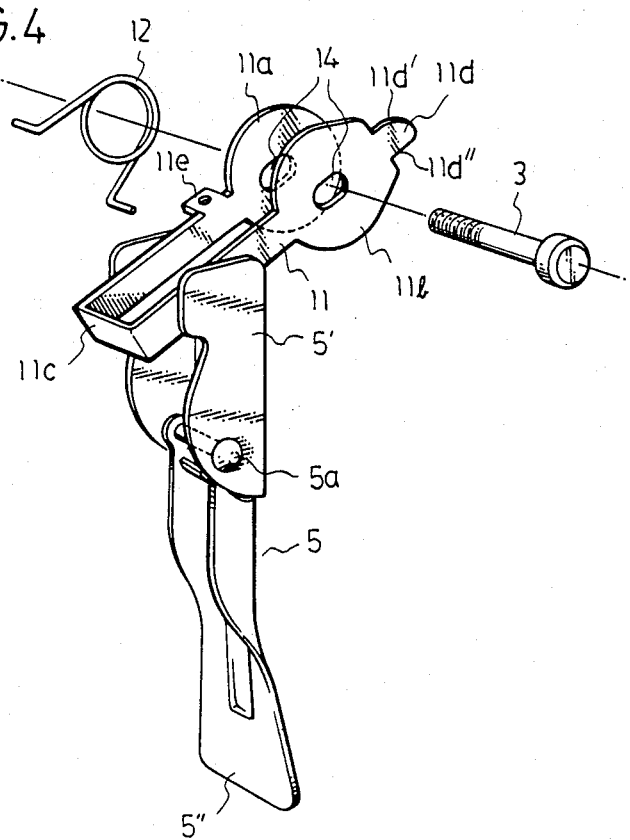
FIG. 4 is a perspective view of the U-shaped member in connection with the operating lever according to the present invention.

The U-shaped member 11 according to the present invention has, as shown in FIG. 4, a sustaining portion 11c for engaging and disengaging pawl 7 and thereby actuating spring 6, and two bolt receiving portions 11a, 11b each with a central elliptical bore 14. At the end of the bolt receiving portion 11b there is formed a projection or protrusion 11d having a curved edge 11d' and a flat opposing edge 11d". And, member 11 has an outwardly extending hook-like projection 11e, with an opening located between the bolt receiving portion 11a and the sustaining portion 11c.

A side wall of the main-disc portion 1a has two inwardly extending punched projections 13, 13' of which one projection 13 is hook-like and has an opening as shown. The ends of spring 12 are hooked to projections 13 and 11e, and projection 13' serves as a limit stop for limiting the elastic action of U-shaped member 11 due to spring 12. And, the central coil of the spring surrounds axial bolt 3.

Second joint member 2 may be also conventionally formed of sheet metal stamped into the shape of the circular sub-disc portion 2a and the tubular portion 2b. According to the invention, the sub-disc portion of the second joint member has inwardly extending projections 10, 10', 10" formed on one side and peripherally distributed open notches 9, 9', 9" formed at the circumferential edge. Projections 10, 10', 10" may alternatively be of circular-shape formed by welding rather than punching as shown.

The joint members 1,2 and the U-shaped member according to the present invention are pivotably connected together as a unit by axial bolt 3, that is, the sub-disc portion 2a of the second joint member 2 is located between the two circular plates of the first joint member 1, and portions 11a, 11b of U-shaped member 11 are respectively located between opposite sides of the portion 2a and the confronting circular plates of member 1. Thus, inside the main-disc portion 1a there are rotatable portions of the second joint member 2 and U-shaped member 11 located between the inner side walls of the main-disc portion 1a and pivoted on axial bolt 3, respectively.

The operation of the aforedescribed construction of the positioning joint according to the present invention will be explained as follows with reference to FIGS. 3A to 3E and 5A, 5B.

FIG. 3A is a cross sectional view of the positioning joint in the disengaged fully closed position, whereas FIG. 3B is a cross sectional view of the same joint in the engaged position in which pawl 7 has been moved along the smooth circumferential edge of the sub-disc portion 2a of joint member 2 until it is locked into open notch 9. When pawl 7 approaches open notch 9, the projection 11d of U-shaped member 11 is pushed by projection 10, while the sustaining portion of U-shaped member 11 is pulled, thereby forcing one end of elliptical bore 14 against axial bolt 3 by the counter-clockwise movement, and spring 12 contracts. Accordingly, pawl 7 is engaged in open notch 9 by the resilient force of spring 6.

Figure 5A:
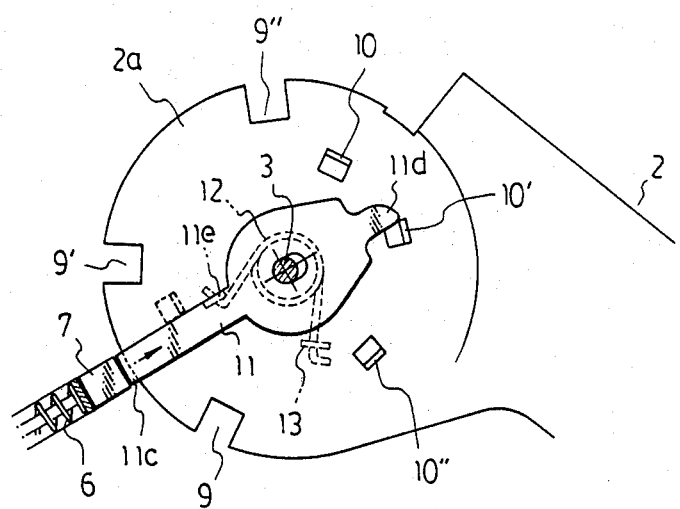
FIGS. 5A and 5B are schematic views of the operation of the U-shaped member in accordance with the present invention.
Figure 5B:
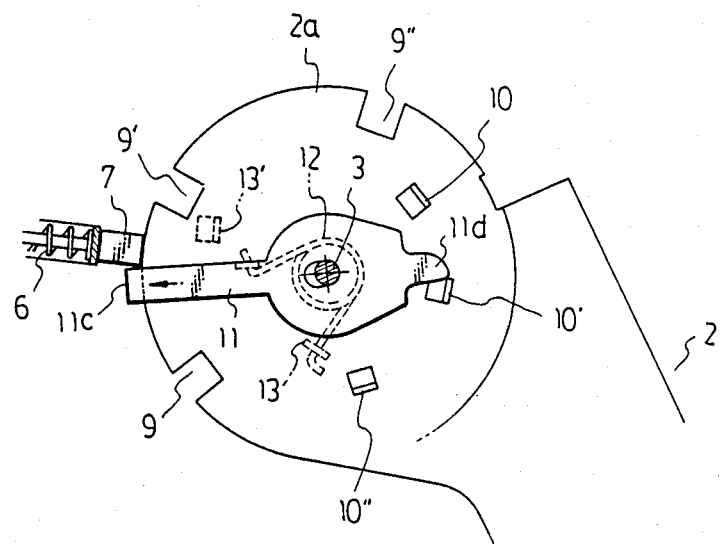

The central bores of the bolt receiving portions 11a, 11b of U-shaped member 11 being elliptically shaped thereby permit positioning of axial bolt 3 at either end of the ellipses by the action of springs 6 and 12. As shown in FIGS. 5A and 5B, when the U-shaped member 11 engages pawl 7, projection 11d is prevented from passing beyond projection 10' because the U-shaped member is pushed by the resilient force of spring 6 in the direction of the arrow in FIG. 5A. Accordingly, if the positioning joint is unfolded further, pawl 7 is disengaged from the U-shaped member. Concomitantly the U-shaped member 11 is pushed by the elastic force of spring 12 in the direction of the arrow in FIG. 5B. Consequently the projection 11d is easily able to pass by the projection 10'.

Figure 3C:
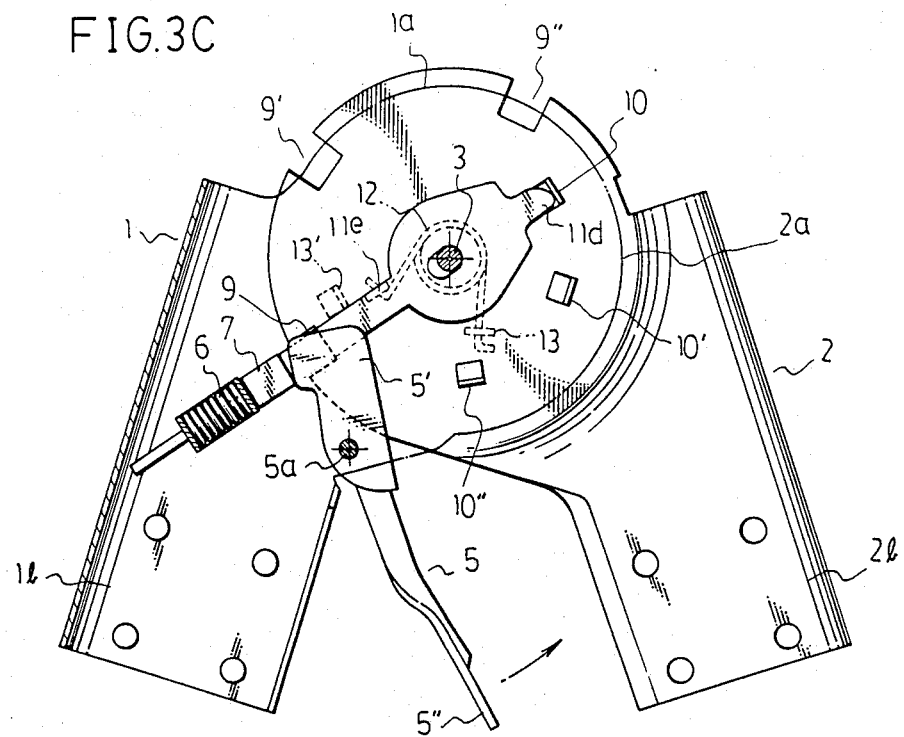
Figure 3D:
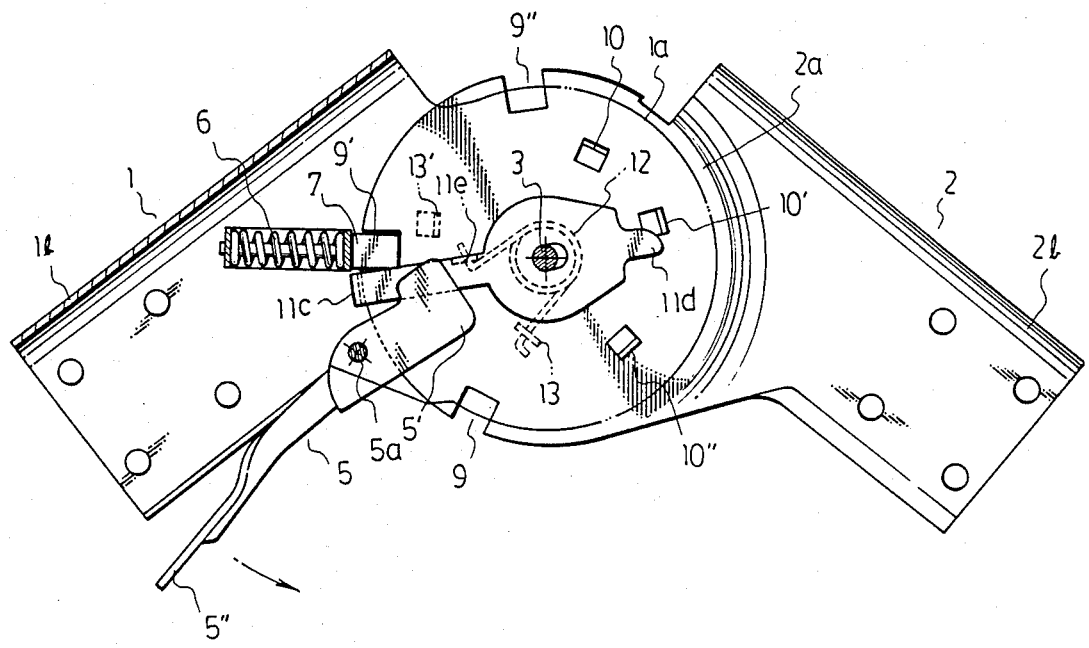

To unfold the positioninq joint further to the position in which pawl 7 will be engaged in notch 9', reference is made to FIGS. 3B and 3C. Upon moving the handle 5" about the pivot pin 5a away from the tubular portion of the first joint member 1, the forked release element of the operating lever 5 turns in a counter-clockwise direction against the resilient force of the spring 6 by pushing against pawl 7, thereby lifting pawl 7 from engagement in notch 9 and concomitantly returning the sustaining portion of U-shaped member 11 by the elastic force of spring 12. Accordingly, as shown in FIG. 3C, the sustaining portion of U-shaped member 11 stopped by the projection 13' engages pawl 7 thereby preventing it from falling back into notch 9 and joint members 1 and 2 are permitted to rotate without interference. Thereafter, the action is repeated but in a different position, that is, when pawl 7 reaches the approximate mid-point between notches 9 and 9', projection 11d of U-shaped member 11 is stopped by the projection 10'. Concomitantly the U-shaped member 11 is pulled in a counter-clockwise direction, spring 12 is depressed, and the opposite end of the elliptical bore is thereby forced against the U-shaped member. Accordingly, pawl 7 is disengaged from the U-shaped member 11 and can now, as shown in FIG. 3D, be engaged by notch 9'.

Figure 3E:
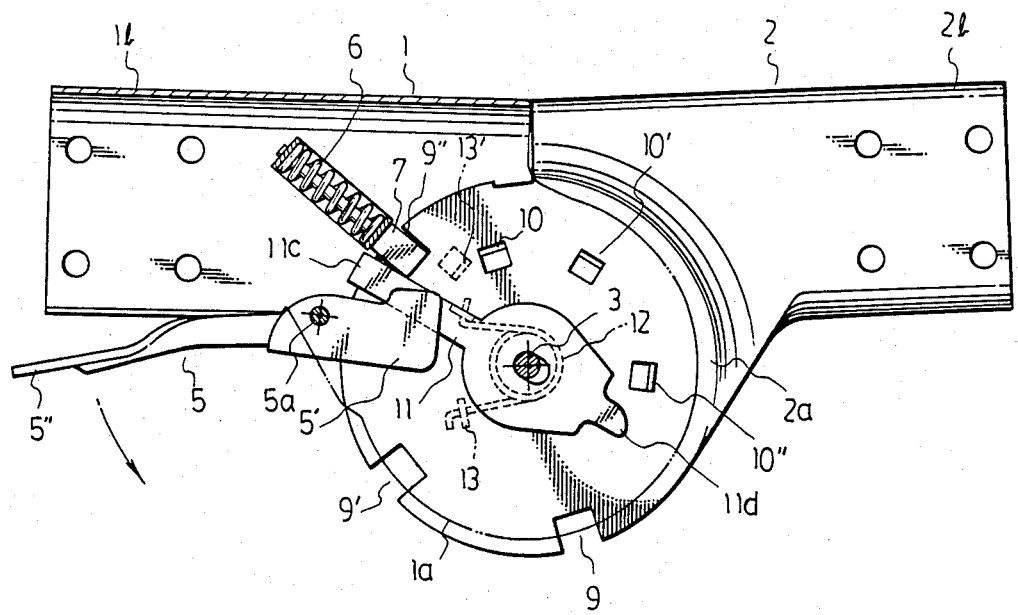

If it is intended to unfold the positioning joint further to engage pawl 7 in notch 9", as shown in FIG. 3E, the positioning joint is unfolded completely by the same aforesaid operating principle.

The operation of folding the positioning joint is explained as follows. With reference to FIG. 3E, upon moving handle 5" about pivot pin 5a away from the tubular portion 1b of first joint member 1 in the direction of the arrow, the release element 5' of the operating lever 5 turns in a counter-clockwise direction against the resilient force of spring 6 by pushing against pawl 7, thereby lifting pawl 7 from engagement in notch 9" and concomitantly returning the sustaining portion of U-shaped member to the engaged position with pawl 7 by the elastic action of spring 12. Accordingly, the sustaining portion of U-shaped member 11 stopped by the projection 13' prevents pawl 7 from falling back into notch 9" and the joint members 1 and 2 are free to rotate without interference. In this condition when the positioning joint is folded, the projection 11d of U-shaped member 11 is able to pass by projections 10, 10', and 10" successively without being engaged by them, because its curved surface 11d' now comes in contact with the projections and thereby is incapable of being stopped. As a result, the positioning joint according to the present invention can be folded rapidly.

From the foregoing it can be seen that the present invention provides an improved positioning joint for a folding ladder which insures safety in use while being easy to operate.

What is claimed is:

1. A positioning joint for a folding ladder of the type in which two joint members which are relatively pivotable about an axial bolt are capable of being inter-locked in a series of predetermined angular positions by engaging a spring-biased pawl mounted on one of the members in notches formed at the peripheral edge of the other member, the one member having a pair of spaced-apart circular plates, the other member having a circular portion located between said plates, a control means in cooperation with a manually operated lever, pivotally connected to said one member and having a release element, controls the locking and unlocking of the joint, the improvement comprising;

a U-shaped member acting as the control means for locking and unlocking said joint, said U-shaped member being pivotable about said bolt and having a sustaining portion for engaging and disengaging said pawl, and two bolt receiving portions each with a central elliptically shaped bore, said bolt receiving portions lying on opposite sides of said circular portion, one of said bolt receiving portions having a protrusion at a free end thereof and said U-shaped member having a hook-like projection located between the other of said bolt receiving portions and said sustaining portion, said bolt extending through each said bore;

one of said plates having a limit stop and a hook-like projection extending toward said U-shaped member, and a spring loosely coiled about said bolt, said spring having ends respectively engaging said hook-like projections for biasing said U-shaped member against said limit stop;

said circular portion having spaced projections extending toward said protrusion, one of said spaced projections engaging said protrusion for shifting said U-shaped member out of engagement with said stop when unfolding the joint upon pivotal movement of said joint members in one direction to permit the pawl to engage in one of the notches, said spring shifting said U-shaped member away from said one projection during said unfolding, said pawl being disengaged from said one of said notches by said release element upon pivotal movement of said lever when further unfolding the joint upon further pivotal movement of said joint members in said one direction, said U-shaped member engaging said stop and said spring shifting said U-shaped member toward said one projection during said further unfolding for preventing said pawl from engaging said one of said notches, said protrusion having a curved edge permitting said U-shaped member to by-pass said spaced projections without stopping when folding the joint upon pivotal movement of said joint members in an opposite direction.

2. A positioning joint in accordance with claim 1, wherein the number of said projections corresponds with the number of the notches.

* * * * *